United States Patent [19]
Ishii

[11] Patent Number: 5,926,750
[45] Date of Patent: Jul. 20, 1999

[54] RECEIVER

[75] Inventor: Junichi Ishii, Tokyo, Japan

[73] Assignee: NEC Corporation, Tokyo, Japan

[21] Appl. No.: 08/831,560

[22] Filed: Apr. 9, 1997

[30] Foreign Application Priority Data

Apr. 9, 1996 [JP] Japan ..................................... 8-086301

[51] Int. Cl.[6] .................................................. H04Q 7/32
[52] U.S. Cl. .......................... 455/130; 455/324; 455/552; 455/336; 455/308; 375/324; 375/328; 375/316; 375/329; 375/345
[58] Field of Search ..................................... 455/552, 324, 455/336, 308; 375/324, 332, 316, 328, 329, 345

[56] References Cited

U.S. PATENT DOCUMENTS

| | | | |
|---|---|---|---|
| 5,392,460 | 2/1995 | Matila et al. ............................. | 455/76 |
| 5,444,736 | 8/1995 | Kawashima et al. ..................... | 375/219 |
| 5,642,378 | 6/1997 | Denheyer et al. ........................ | 375/216 |
| 5,745,523 | 4/1998 | Dent et al. ............................... | 375/216 |
| 5,757,858 | 5/1998 | Black et al. .............................. | 375/295 |

FOREIGN PATENT DOCUMENTS 3-244181  10/1991  Japan .

Primary Examiner—Dwayne D. Bost
Assistant Examiner—Alan Gantt
Attorney, Agent, or Firm—Scully, Scott, Murphy & Presser

[57] ABSTRACT

In accordance with the present invention, a receiver of the type receiving both a signal subjected to FM (Frequency Modulation) and a signal subjected to orthogonal modulation is capable dealing with the two different kinds of signal by use of a single demodulator. This successfully scales down the circuitry of the receiver.

7 Claims, 3 Drawing Sheets

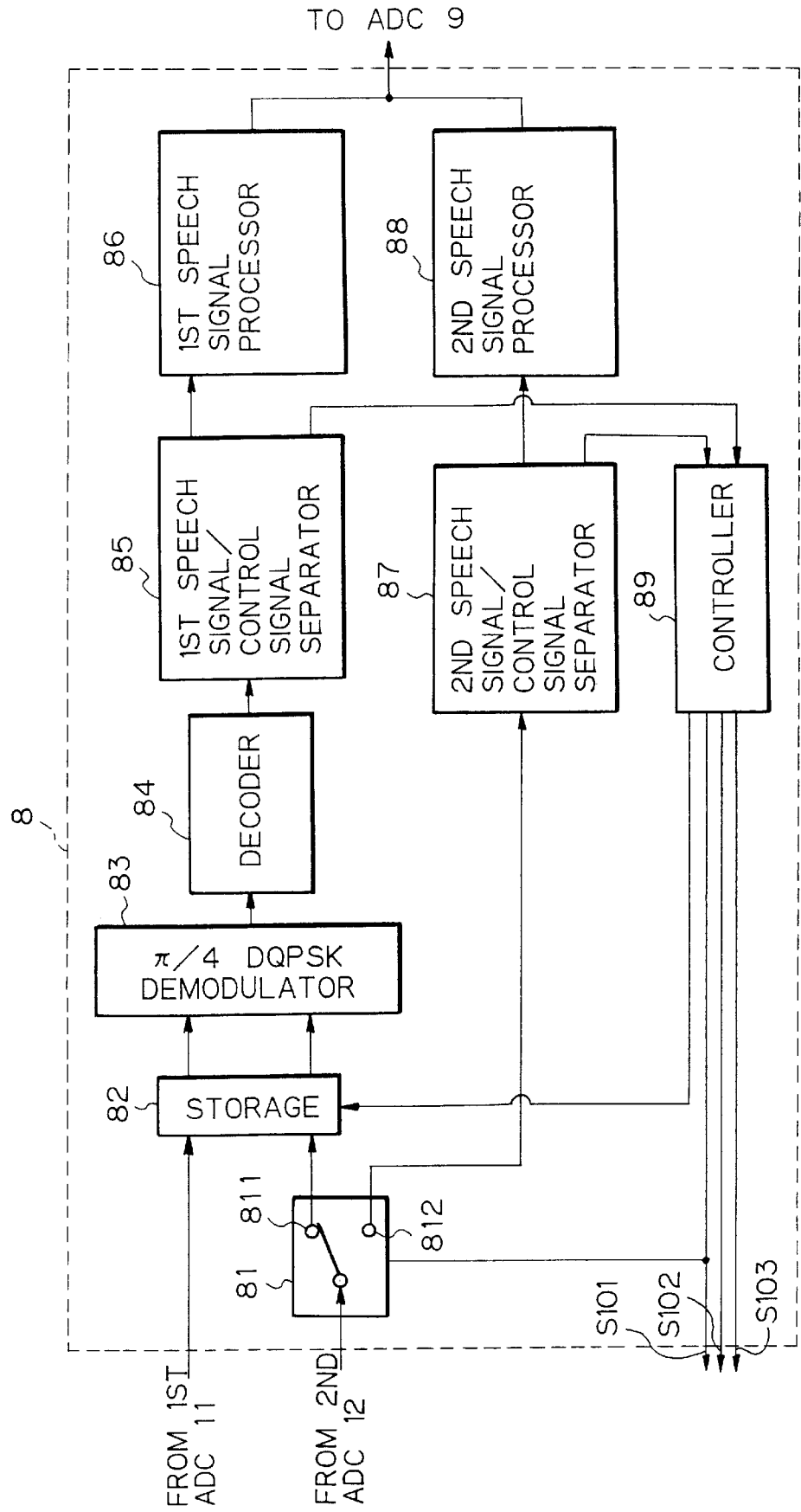

5,926,750

RECEIVER

BACKGROUND OF THE INVENTION

The present invention relates to a receiver and, more particularly, to a receiver of the type capable of receiving both a signal subjected to orthogonal modulation and a signal subjected to frequency modulation (FM).

In North America, a receiver capable of receiving both an orthogonally modulated signal and an FM signal, as prescribed by the IS136 standard relating to cellular telephones, is required in recent years. A receiver with such a capability has customarily included two demodulators for respectively demodulating the orthogonally modulated signal and FM signal, as taught in Japanese Patent Laid-Open publication No. 3-244181 by way of example. The problem with this kind of scheme is that the two independent demodulators scale up the circuitry of the receiver.

SUMMARY OF THE INVENTION

It is therefore an object of the present invention to provide a receiver capable of demodulating both an orthogonally modulated signal and an FM signal with a single demodulator.

A receiver of the present invention includes a converting section for converting a received signal to an intermediate frequency (IF) signal. A local oscillator outputs a local oscillation frequency signal. A first switch receives the IF signal and local oscillation frequency signal, and outputs the IF signal when an FM signal is to be demodulated or outputs the local oscillation frequency signal when an orthogonally modulated signal is to be demodulated. A first frequency mixer mixes the IF signal output from the converting section and the output of the first switch with respect to frequency. A $\pi/2$ phase shifter shifts the phase of the output of the first switch by $\pi/2$. A second frequency mixer mixes the IF signal output from the converting section and the output of the or $\pi/2$ phase shifter with respect to frequency.

BRIEF DESCRIPTION OF THE DRAWINGS

The above and other objects, features and advantages of the present invention will become apparent from the following detailed description taken with the accompanying drawings in which:

FIG. 2 is a block diagram schematically showing a specific configuration of a digital signal processor included in the embodiment.

DESCRIPTION OF THE PREFERRED EMBODIMENT

Figure 1:
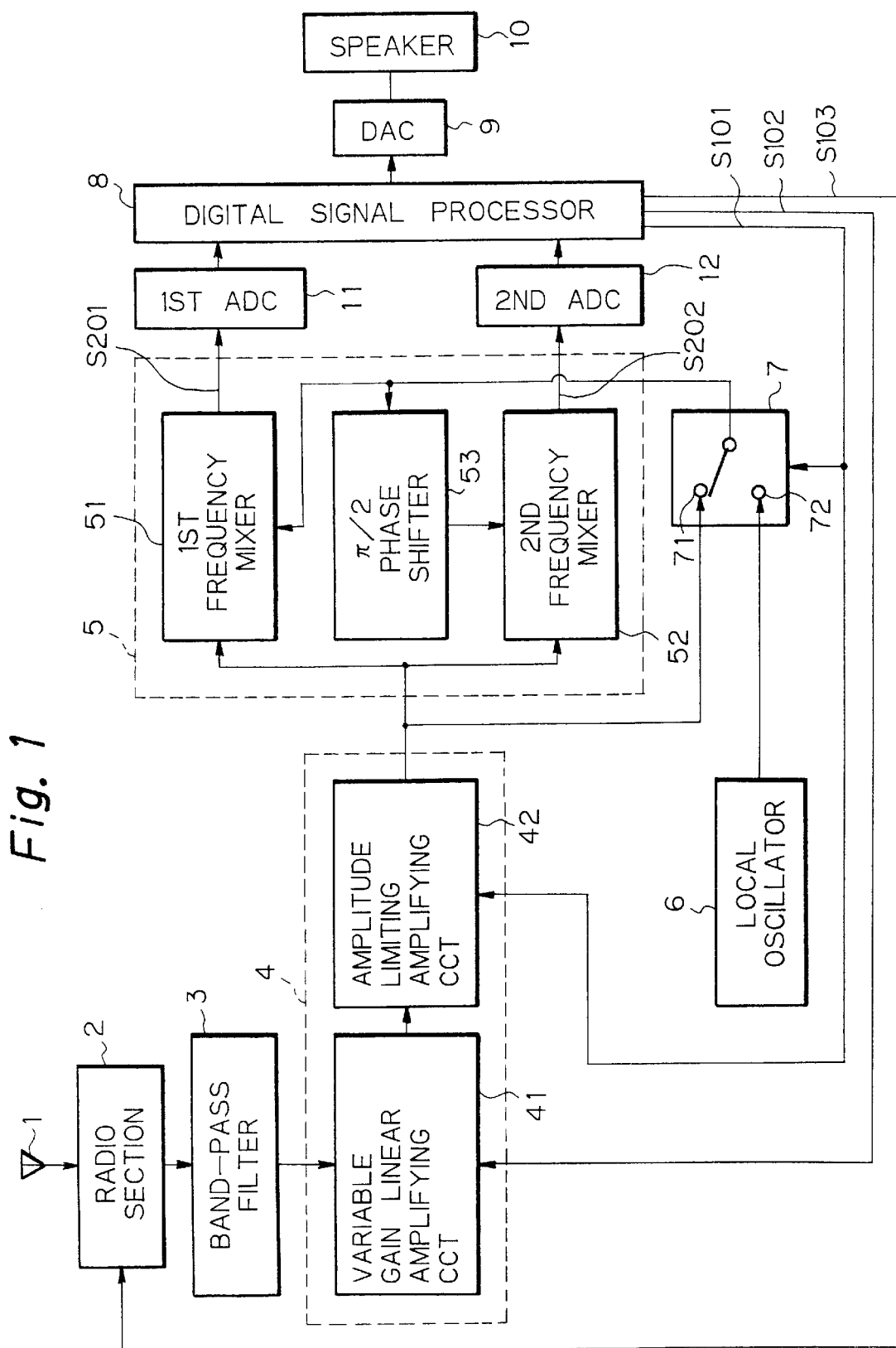
FIG. 1 is a block diagram schematically showing a receiver embodying the present invention.

Referring to FIG. 1 of the drawings, a receiver embodying the present invention is shown and includes an antenna 1. A radio signal sent from a base station, not shown, is received by the antenna 1 and fed to a radio section 2. A digital signal processor 8 delivers a frequency control signal S103 to the radio section 2 so as to switch its receipt frequency. The radio section 2 converts the received signal to an IF (Intermediate Frequency) signal and feeds the IF signal to an IF amplifier 4 via a band-pass filter 3.

The IF amplifier 4 is made up of a variable gain linear amplifying circuit 41 and an amplitude limiting amplifying circuit 42. The digital signal processor 8 delivers to the amplifying circuit 41 a first switching control signal S102 for causing the circuit 41 to amplify the output of the band-pass filter 3 either in a linear range or in a non-linear range. The amplifying circuit 41 amplifies the output of the band-pass filter 3 and feeds its output to the other amplifying circuit 42. The digital signal processor 8 delivers a second switching control signal S101 to the amplifying circuit 42 in order to turn it on or turn it off. The amplifying circuit 42 amplifies the output of the amplifying circuit 41 while limiting its amplitude. The resulting output of the amplifying circuit 41 is applied to an orthogonal demodulator 5 and a switch 7.

A local oscillator 6 feeds its output, i.e., a local oscillation frequency signal to the switch 7. The switch 7 has its input selectively connected to a terminal 71 or a terminal 72 by the second switching control signal S101 fed from the signal processor 8. As a result, the switch 7 delivers either the output of the local oscillator 6 or that of the amplitude limiting amplifying circuit 42 to a first frequency mixer 51.

The orthogonal demodulator 5 has a second frequency mixer 52 and a $\pi/2$ phase shifter 53 in addition to the first frequency mixer 51. The first frequency mixer 51 mixes the output of the amplifying circuit 42 and that of the switch 7 with respect to frequency, thereby outputting an in-phase demodulated signal (I signal hereinafter) S201. The $\pi/2$ phase shifter 53 shifts the phase of the output of the switch 7 by $\pi/2$ and feeds the resulting signal to the second frequency mixer 52. The second frequency mixer 52 mixes the output of the amplifying circuit 42 and that of the $\pi/2$ phase shifter 53, and thereby produces a reverse-phase demodulated signal (Q signal hereinafter) S202. A first analog-to-digital converter (ADC) 11 digitizes the I signal output from the first frequency mixer 51 and delivers the digitized signal to the signal processor 8. Likewise, a second ADC 12 digitizes the Q signal output from the second frequency mixer 52 and feeds the digitized signal to the signal processor 8.

The signal processor 8 decodes the digitized I signal and Q signal so as to separate a speech signal and control signals. The speech signal is fed from the signal processor 8 to a digital-to-analog converter (DAC) 9. The signal processor 8 outputs the previously mentioned control signals S101, S102 and S103 on the basis of the separated control signals. The DAC 9 transforms the speech signal output form the signal processor 8 to an analog speech and outputs it via a speaker 10.

FIG. 2 shows a specific configuration of the digital signal processor 8. The specific configuration is assumed to conform to the IS136 standard. As shown, a controller 89 delivers the second switching control signal S101 to a switch 81 in order to connect its output to a terminal 811 or a terminal 812. In response, the switch 81 delivers the digitized Q signal output from the second ADC 12 to either a storage 82 or a second speech signal/control signal separator 87.

The digital I signal output from the first ADC 11 and the Q signal input via the switch 81 are written to the addresses of the storage 82 designated by the controller 89. The I and Q signals read out of the storage 89 are fed to a $\pi/4$ DQPSK (Differential Quadrature Phase Shift Keying) demodulator 83.

The $\pi/4$ DQPSK demodulator 83 detects the amplitude of the I signal and that of the Q signal in order to correct errors ascribable to the radio transmission channel. At the same time, the demodulator 83 demodulates the I and Q signals by DQPSK and feeds the demodulated I and Q signals to a decoder 84.

The decoder 84 decodes the demodulates I and Q signals and thereby descrambles the signal come in through the antenna 1. The decoded signal is fed to a first speech signal/control signal separator 85. In response, the signal separator 85 separates the decoded signal into a speech signal and control signals. The speech signal is output to a first speech signal processor 86 while the control signals are output to the controller 89. The speech signal processor 86 processes the speed signal output from the signal separator 85 and feeds its output to the DAC 9.

The second speech signal/control signal separator 87 received the Q signal via the switch 81 separates the Q signal into a speech signal and control signals. The speech signal is output to a second speech signal processor 88 while the control signals are output to the controller 89. The speech signal processor 88 executes speech signal processing with the input speech signal and feeds its output to the DAC 9.

On receiving the control signals from the first signal separator 85 or the second signal separator 87, the controller 88 detects a FACCH (Fast Associated For The Traffic Channel) relating to the agreement between the base station and the receiver as to communication. Then, the controller 88 detects from the FACCH an RF channel indicating the frequency of the received radio signal, a rate indicating whether the radio signal has a half rate or whether it has a full rate, and a time slot indicator indicating the time slot used. With these information, the controller 88 determines the modulation system of the next radio signal to be received. The controller 88 outputs the control signals 101, 102 and 103 in accordance with the modulation system of the next radio signal.

The operation of the illustrative embodiment will be described with reference to FIGS. 1 and 2. Assume that the receiver receives both a $\pi/4$ DQPSK modulated signal and an FM signal, the former signal first. The controller 89 detects the RF channel, rate and time slot indicator out of the FACCH included in the control signals, and determines that a signal to be received next is a $\pi/4$ DQPSK signal on the basis of such information. Then, the controller 89 delivers the frequency control signal S103 to the radio section 2 such that the antenna 1 receives a signal at the frequency indicated by the radio channel. That is, the controller 89 tunes the radio section 2 to the above frequency. In addition, the controller 89 feeds the first switching control signal S102 to the variable gain linear amplifying circuit 41 in order to cause it to amplify the output of the band-pass filter 3 in the linear range. Thereafter, the gain of the amplifying circuit 41 is automatically controlled. Further, the controller 89 delivers the second switching control signal S101 to the amplitude limiting amplifying circuit 42 and switches 7 and 82 such that the amplifying circuit 42 is turned off, the switch 7 is connected to the terminal 72, and the switch 81 is connected to the terminal 811.

In the above condition, a radio signal received by the antenna 1 is fed to the radio section 2 and transformed to an IF signal thereby. The IF signal is filtered by the band-pass filter 3 and then input to the variable gain linear amplifying circuit 41. The amplifying circuit 41 amplifies the filtered signal nearly with its gain automatically controlled. Because the amplitude limiting amplifying circuit 42 is in its OFF state, the output of the amplifying circuit 41 is applied to the first and second frequency mixers 51 and 52 and switch 7 without being amplified by the amplifying circuit 42.

The local oscillation frequency signal output from the local oscillator 6 is fed to the first frequency mixer 51 and $\pi/2$ phase shifter 53 via the switch 7 which is connected to the terminal 72. The frequency mixer 51 mixes the local oscillation frequency signal and the output of the amplifying curcuit 42, and feeds the resulting I signal to the first ADC 11.

At the same time, the local oscillation frequency signal is applied to the n/2 phase shifter 53 to have its phase shifted by $\pi/2$. The output of the circuit 53 is mixed with the output of the amplifying circuit 42 by the second frequency mixer 52 to turn out a Q signal. The Q signal is input to the second ADC 12.

The first ADC 11 digitizes the I signal output from the first frequency mixer 51 and writes the digitized I signal in the storage 82. The second ADC 12 digitizes the Q signal output from the second frequency mixer 52 and feeds the digitized Q signal to the switch 81.

The digital Q signal output from the ADC 12 is written to the storage 82 via the switch 82 which is connected to the terminal 811. The digital I and Q signals are written to the addresses of the storage 82 designated by the controller 89. The I and Q signals are read out of the storage 82 under the control of the controller 89 and fed to the $\pi/4$ DQPSK demodulator 83. The $\pi/4$ DQPSK demodulator 83 corrects the errors of the I and Q signals and then demodulates the signals. The demodulated signal is input to the decoder 84 and descrambled thereby, as stated earlier. The first speech signal/control signal separator 85 separates the decoded signal into a speech signal and control signals. This can be done because the decoded signal has been descrambled. The speech signal is output to the first speech signal processor 86 while the control signals are output to the controller 89.

The speech signal processor 86 processes the speech signal and delivers the processed speech signal to the DAC 9. The DAC 9 transforms the digital speech signal to an analog speech signal. As a result, the analog speech signal, i.e., a speech is output via the speaker 10.

On the other hand, the control signals output from the first speech/control signal separator 85 are input to the controller 89. In response, the controller 89 detects the FACCH and then detects the RF channel, rate, and time slot indicator. The controller 89 determines, based on such information, whether the next signal to be received is a $\pi/4$ DQPSK signal or whether it is an FM signal.

If the next signal to be received is a $\pi/4$ DQPSK signal, then the controller 89 does not change the contents of the control signals 101–103. On the hand, if the next signal is an FM signal, the controller 89 tunes the radio section 2 with the control signal S203 such that the antenna 1 receives a signal at a frequency indicated by the RF channel. At the same time, the controller 89 controls the amplifying circuit 41 with the first switching control signal 102 such that the circuit 41 amplifies the output of the band-pass filter 3 in the non-linear range, i.e., by the maximum gain. In addition, the controller 89 turns on the amplifying circuit 42, connects the switch 7 to the terminal 71, and connects the switch 81 to the terminal 811 with the second switching control signal S101.

In the above condition, a signal received by the antenna 1 is fed to the radio section 2 and transformed to an IF signal thereby. The IF signal is filtered by the band-pass filter 3 and then applied to the amplifying circuit 41. The amplifying circuit 41 amplifies the input IF signal non-linearly and feeds its output to the amplifying circuit 42. The amplifying circuit 42 amplifies the input signal while limiting its amplitude. The output of the amplifying circuit 42 is fed to the two frequency mixers 51 and 52 and switch 7.

The output of the amplifier 42 is routed through the switch 7 to the frequency mixer 51 and $\pi/2$ phase shifter 53 because the switch 7 is connected to the terminal 72. The frequency mixer 51 mixes the output of the amplifying circuit 42 and that of the amplifying circuit 42. In this case, an I signal output from the mixer 51 is zero because the two inputs to the mixer 51 are identical. The π/2 phase shifter 53 shifts the phase of the signal input via the switch 7 by π/2, and delivers the resulting signal to the frequency mixer 52. The frequency mixer 52 mixes the output of the π/2 phase shifter 53 and the output of the amplifying circuit 42, i.e., subjects them to frequency demodulation. The resulting FM demodulated signal or Q signal S202 is applied to the ADC 12. The ADC 12 digitizes the Q signal S202 and feeds the digitized Q signal to the switch 81.

Because the switch 81 is connected to the terminal 812, the digital Q signal output from the ADC 12 is input to the speech signal/control signal separator 87. Because the FM signal has not been scrambled, the signal separator 87 can see which part of the FM signal corresponds to a speech and which part of the same corresponds to control signals. Therefore, the signal separator 87 separates the FM signal into a speech signal and control signals. The speech signal and control signals are applied to the speech signal processor 88 and controller 89, respectively.

The speech signal output from the signal separator 87 is processed by the speech signal processor 88 and then input to the DAC 9. The DAC 9 transforms the digital speech signal to an analog speech signal. The speech signal is output via the speaker 10 in the from of a speech.

On the other hand, the control signals output from the second speech/control signal separator 87 are input to the controller 89. In response, the controller 89 detects the FACC and then detects the RF channel, rate, and time slot indicator. The controller 89 determines, based on such information, whether the next signal to be received is a π/4 DQPSK signal or whether it is an FM signal. The controller 89 controls the radio section 2, two amplifying circuits 41 and 42 and two switches 7 and 81 on the basis of the result of the above decision.

Figure 3A:
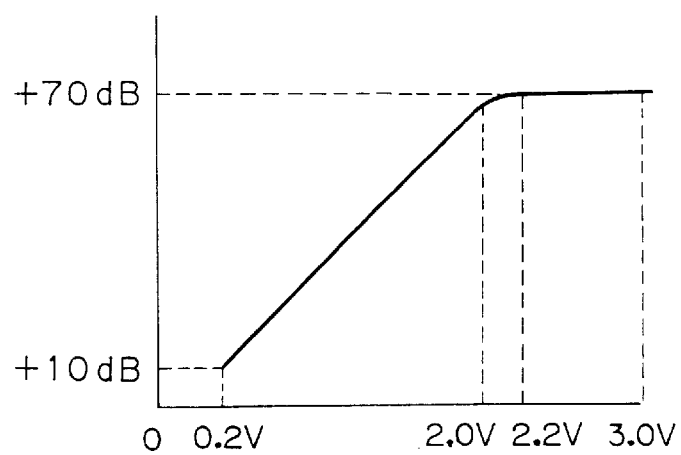
FIGS. 3A–3C show specific voltages of control signals appearing in the embodiment.
Figure 3B:
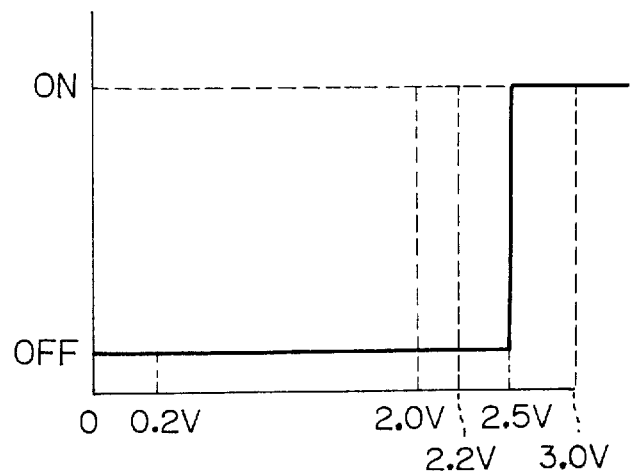
Figure 3C:
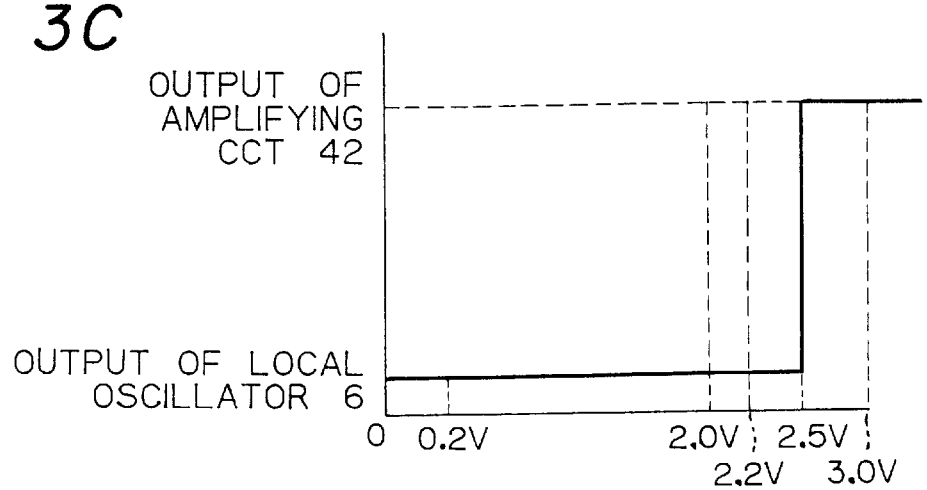

FIGS. 3A–3C show specific voltages of the control signals S101 and S102. As shown in FIG. 3A, when the voltage of the control signal S102 is 0.2 V to 2.2 V, it causes the variable gain amplifying circuit 41 to operate linearly. The control signal S102 causes the amplifying circuit 41 to operate non-linearly when its voltage is 2.2 V to 3.0 V. As shown in FIGS. 3B and 3C, when the voltage of the control signal S101 is 0.0 V to 2.5 V, it turns off the amplitude limiting amplifying circuit 42. As a result, the local oscillation frequency signal is routed through the switch 7 to the frequency mixer 51 and π/2 phase shifter 53. The control signal S101 turns on the amplifying circuit 42 when its voltage is higher than 2.5 V inclusive, so that the output of the amplifying circuit 42 is routed through the switch 7 to the frequency mixer 51 and π/2 phase shifter 53.

Therefore, the control signals S101 and S102 shown and described as being output independently may be implemented as a single control signal, as follows. When an FM signal is to be received, the voltage of the single control signal is varied in the range of from 0.2 V to 2.0 V, causing the amplifying circuit 41 to operate linearly. At the same time, the control signal turns off the amplifying circuit 42 with the result that the local oscillation signal is output from the switch 7. On the other hand, when a π/4 DQPSK signal is to be received, the control voltage is varied in the range of from 2.5 V and 3.0 V, causing the amplifying circuit 41 to operate non-linearly. At the same time, the control signal turns on the amplifying circuit 42 with the result that the output of the amplifying circuit 42 is output via the switch 7.

In summary, it will be seen that the present invention provides a receiver of the type receiving both an FM signal and an orthogonally modulated signal, and capable of dealing with the two different kinds of signals by use of a single demodulator. This successfully scales down the circuitry of the receiver.

Various modifications will become possible for those skilled in the art after receiving the teachings of the present disclosure without departing from the scope thereof. For example, while the embodiment has concentrated on the IS136 standard, the present invention is applicable to all the receivers of the type capable of receiving both an FM signal and an orthogonally modulated signal. In addition, the present invention is practicable any kind of receiver required to selectively perform linear modulation or amplitude limiting modulation. If the orthogonally modulated signal does not have to be linearly amplified, i.e., if a QPSK modulated signal is to be demodulated, then the IF amplifier may be implemented only by the amplitude limiting amplifying circuit.

What is claimed is:

1. A receiver comprising:

converting means for converting a received signal to an IF signal;

local oscillation means for outputting a local oscillation frequency signal;

first switching means for receiving said IF signal and said local oscillation frequency signal, and outputting said IF signal when an FM signal is to be demodulated or outputting said local oscillation frequency signal when an orthogonally modulated signal is to be demodulated;

first frequency mixing means for mixing said IF signal output from said converting means and an output of said first switching means with respect to frequency;

π/2 phase shifting means for shifting a phase of an output of said first switching means by π/2; and second frequency mixing means for mixing said IF signal output from said converting means and an output of said π/2 phase shifting means with respect to frequency.

2. A receiver as claimed in claim 1, wherein the orthogonally modulated signal is a π/4 DQPSK modulated signal.

3. A receiver as claimed in claim 1, further comprising amplifying means for receiving said IF signal output from said converting means, and amplifying, when the orthogonally modulated signal is to be demodulated, said IF signal linearly or amplifying, when the FM signal is to be demodulated, amplifying said IF signal while limiting an amplitude of said IF signal, and feeding a resulting output of said amplifying means to said converting means and said first and second frequency mixing means.

4. A receiver as claimed in claim 3, further comprising an antenna for receiving a radio signal, and radio means for setting a frequency of the radio signal to be received by said antenna.

5. A receiver as claimed in claim 4, further comprising control means for detecting control signals out of the radio signal, and controlling, based on the control signals, the output signal of said first switching means, linear/amplitude limiting amplification of said amplifying means, and frequency setting of said radio means.

6. A receiver as claimed in claim 5, further comprising:

an orthogonal demodulator for receiving an output of said first frequency mixing means produced by digitizing an in-phase modulated signal;

first speech signal/control signal separating means for separating a digitized FM demodulated signal into an FM demodulated signal and the control signals;

second switching means for receiving a reverse-phase modulated signal output from said second frequency mixing means, and outputting, when the FM signal is to be demodulated, said reverse-phase modulated signal to said first speech signal/control signal separating means as said digitized FM demodulated signal or outputting, when the reverse-phase modulated signal is to be demodulated, a digitized signal of said reverse-phase modulated signal to said orthogonal modulator;

second speech signal/control signal separating means for separating a signal demodulated by said orthogonal demodulator into a speech signal and the control signals;

first speech signal processing means for executing speech signal processing with said speech signal output from said first speech signal/control signal separating means; and second speech signal processing means for executing speech signal processing with the speech signal output from said second speech signal/control signal separating means.

7. A receiver as claimed in claim 6, further comprising a digital-to-analog converting means for converting said speech signal output from said first speech signal/control signal separating means and said speech signal output from said second speech signal/control signal separating means to analog speech signals, and a speaker for outputting said analog speech signals.

* * * * *